United States Patent

Frank et al.

[11] Patent Number: 5,941,279
[45] Date of Patent: Aug. 24, 1999

[54] FUEL CONTAINER

[75] Inventors: Kurt Frank, Schorndorf; Guenter-Paul Ballier, Oberriexigen; Rolf Fischerkeller, Walheim; Gerhard Jauch, Markgroeningen, all of Germany

[73] Assignee: Robert Bosch GmbH, Stuttgart, Germany

[21] Appl. No.: 08/989,717

[22] Filed: Dec. 12, 1997

[30] Foreign Application Priority Data

Dec. 12, 1996 [DE] Germany .......................... 196 51 652

[51] Int. Cl.⁶ .................................................. F02M 33/02
[52] U.S. Cl. .......................... 137/574; 137/576; 123/514
[58] Field of Search .................... 137/571, 574, 137/576; 123/514, 516

[56] References Cited

U.S. PATENT DOCUMENTS

| | | | |
|---|---|---|---|
| 2,953,156 | 9/1960 | Bryant | 137/576 X |
| 3,020,950 | 2/1962 | Schraivogel | 137/574 X |
| 3,049,171 | 8/1962 | Neuerburg et al. | 137/574 X |
| 4,279,232 | 7/1981 | Schuster et al. | 123/514 X |
| 4,397,333 | 8/1983 | Liba et al. | 137/574 |
| 4,503,885 | 3/1985 | Hall | 137/574 |
| 4,838,307 | 6/1989 | Sasaki et al. | 137/574 |
| 4,842,006 | 6/1989 | Scheurenbrand et al. | 137/574 X |
| 4,886,031 | 12/1989 | Scheurenbrand et al. | 137/574 X |
| 5,029,611 | 7/1991 | Sasaki | 137/574 |
| 5,078,169 | 1/1992 | Scheurenbrand et al. | 137/574 |
| 5,396,872 | 3/1995 | Ruger et al. | 123/514 |

FOREIGN PATENT DOCUMENTS 39 15 185 C1   10/1990   Germany .

*Primary Examiner*—John Rivell
*Attorney, Agent, or Firm*—Michael J. Striker

[57] ABSTRACT

A fuel container for a motor vehicle has at least two supply chambers and a withdrawal chamber, a fuel pump feeding fuel from the withdrawal chamber, a pump circulating device operating in accordance with the principle of a suction jet and circulating fuel from at least one of the supply chambers into the withdrawal chamber, the pump circulating device including a single nozzle through which at least a part of a fuel stream fed by the fuel pump passes through it, and at least two suction pipes arranged one after the other in alignment with one another in a fuel jet produced by the nozzle and having suction inlets which communicate with a respective one of the supply chambers, a last one of the suction pipes having an outlet which faces away from the nozzle and is connected with the withdrawal chamber.

11 Claims, 2 Drawing Sheets

FUEL CONTAINER

BACKGROUND OF THE INVENTION

The present invention relates to a fuel container for motor vehicles.

One of such fuel containers is disclosed for example in the German patent document DE 39 15 185 C1. It is saddle-shaped so that the saddle pockets form container chambers including a withdrawal chamber for fuel which is identified as a back-up vessel. The pump circulating device has two jet pumps each including a nozzle and a suction or mixing tube, which are arranged parallel or in series in the return flow of the fuel or in a partial feed flow which directly branches from the feed flow of the fuel pump. The suction jet pump is arranged in a supply chamber in the vicinity of the bottom, while the suction pipe arranged coaxially to the nozzle axis merges into a coaxial suction funnel of the end region of the nozzle. The suction pipe outlet of both jet pumps are connected each to two guiding tubes which open in the withdrawal chamber. The fuel container of this type can be further improved.

SUMMARY OF THE INVENTION

Accordingly, it is an object of present invention to provide a fuel container for a motor vehicle which has advantages over the existing fuel containers of this type.

In keeping with these objects and with others which will become apparent hereinafter, one feature of present invention resides, briefly stated in a fuel container, in which the pump circulating device has a single nozzle through which at least a part of the feed flow of the fuel pump passes, and at least two suction pipes arranged in alignment one behind the other in the nozzle jet and having suction inlets communicate each with a supply chamber, and the outlet of the last suction pipe which faces away from the nozzle is connected with the withdrawal chamber.

When the fuel container is designed in accordance with present invention, it has the advantage that the pump circulating device for securing a uniform filling of the withdrawal chamber is produced substantially inexpensively and needs low energy consumption, since only one nozzle must be supplied with the fuel driving quantity and thereby the fuel pump must feed less additional fuel for the pump circulating device so that its feeding power can be reduced.

Depending on the construction of the suction or mixing pipe, the supply chambers can be completely emptied approximately uniformly or one after the other. In the later case, the chamber associated with the front suction pipe is emptied first, and then after the complete emptying of this chamber, the front suction pipe is bridged by the nozzle jet and only then the second suction pipe is used.

In accordance with a further embodiment of the invention, the chambers in the supply container are separated, starting from the bottom of the container, by partitions which are spaced from one another. One of the aligned suction pipes passes through both partitions between the chambers. Thereby the structural and manufacturing expenses for the pump circulating device are maintained extremely low since the suction pipe for the connection between the individual chambers is provided and additional connection pipes can be dispensed with.

In accordance with a further embodiment of the invention, the suction inputs of the suction pipes are formed concentrically to the pipe axis, so that a rotation-symmetrical geometry of the suction pipe which is favorable for manufacture is provided.

When the front suction pipe is arranged at an axial distance from the outlet of the nozzle and the rear suction pipe is arranged with an axial distance from the end of the front suction pipe, the pump circulating device pumps the fuel from the front supply chamber, in which the nozzle is arranged, mainly into the rear supply chamber, while the filling of the withdrawal chamber connected with the rear supply chamber is performed mainly by the level compensation by the rear suction pipe. When the front supply chamber is emptied, the first suction pipe is completely bridged by the free jet of the nozzle, and through the rear suction pipe the rear ventilation chamber is emptied by pumping the fuel into the withdrawal chamber.

In accordance with an alternative embodiment of the invention, the front suction pipe is arranged with an axial distance from the outlet of the nozzle, and the rear suction pipe engages the end of the front suction pipe so as to leave an opening. For this purpose either the diameter of the rear suction pipe is greater than the front suction pipe, or the front end of the rear suction pipe is provided with an opening funnel. In this embodiment of the pump circulating device, both supply chambers arranged after one another are approximately uniformly emptied into the withdrawal chamber. The front supply chamber in which the nozzle is arranged has a lower emptying course.

When the fuel container is formed as a saddle tank, its two saddle pockets which are connected with one another by a bridging chamber form two supply chambers.

In accordance with a preferable embodiment of the invention, the pump circulating device is arranged in the saddle pocket, in which the withdrawal chamber is placed. The front suction pipe is connected with the nozzle without a gap and has a suction inlet whose axis extends under an acute angle to the suction pipe axis. A suction conduit is connected with it and opens in the vicinity of the bottom into the other saddle pocket. The suction inlet of the rear suction pipe is formed concentrically into the pipe axis, and the suction pipe passes through the separating partition of the withdrawal chamber from the supply chamber. Depending on whether the rear suction pipe is arranged at an axial distance to the end of the front suction pipe, or it merges into it with maintaining an opening which forms a suction input, a successive or approximately simultaneous emptying of both ventilation chambers is achieved.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
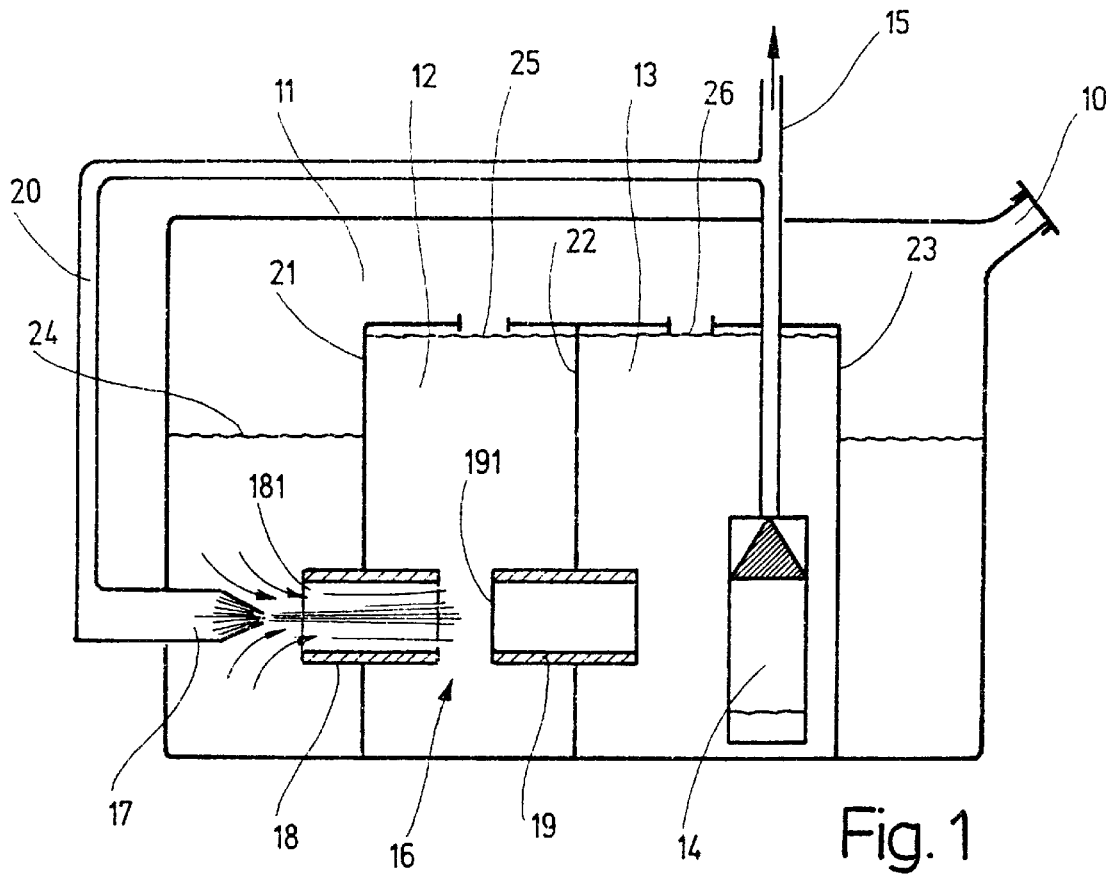
FIG. 1 is a longitudinal section of a fuel container with a pump circulating device in accordance with present invention.

A closed fuel container for a vehicle which is shown in the section of FIG. 1 has a fuel filling pipe 10. It is subdivided into two supply chambers 11 and 12 and a fuel withdrawal chamber 13 which is also known as a pressure vessel. The chambers 11, 12, 13 are separated from one another by partitions 14, 15, 16 which extend from the bottom of the supply container transversely from one side wall to another side wall. The partitions end at a distance from an upper side of the fuel container, so that an overflow is provided between the chambers 11, 12, 13. During filling of fuel in the supply container all chambers 11, 12, 13 are filled with fuel. In the embodiment shown in FIG. 1 the first supply chamber 12 and the withdrawal chamber 13 are closed at their upper side and provided with only a small inlet opening, while the inlet pipe 10 opens in the supply chamber 11. A fuel pump 14 is arranged in the withdrawal chamber 13. It feeds the fuel from the withdrawal chamber 14 through a feed conduit 15 to the internal combustion engine. In order to ensure that during the withdrawal of fuel supply in the fuel container the fuel pump 14 is also immersed in fuel, a pump circulating device 16 is provided in the fuel container. It pumps fuel from both supply chambers 11, 12 into the withdrawal chamber 13 so that the withdrawal chamber 13 is always completely filled with fuel during reducing fuel supply.

The pump circulating device 16 operates in accordance with the principle of a suction jet and includes a nozzle 13 and two suction pipes 18, 19 arranged with aligned pipe axes one after the other in the nozzle jet. For producing the nozzle jet, the nozzle 17 is connected with a fuel conduit 20 which branches from the feed conduit 15. Therefore a partial stream is supplied from the fuel which is fed by the fuel pump 14 to the nozzle 17 and passes through the nozzle 17 as a nozzle jet with both suction pipes 18, 19. A negative pressure or a suction pressure is produced in a known manner at the suction inputs of the suction pipes 18, 19. Alternatively, the nozzle 17 can be connected with the fuel return conduit which, in a known manner, returns the excessive fuel from the internal combustion engine into the fuel container. In this case, the fuel conduit 20 can be dispensed with.

In the embodiment shown in FIG. 1, the suction pipes 18, 19 are formed as cylindrical tubular pipes with identical or different diameters. Each suction pipe 18, 19 passes through the partition 21, 22 which separates the chambers 11, 12, 13 from one another. The suction pipe 18 which passes through the partition 21 connects the first supply chamber 11 with the second supply chamber 12. The suction pipe 19 which passes through the partition 22 connects the second supply chamber 12 with the withdrawal chamber 13. The nozzle 17 is associated with the suction pipe 18 and is located in the first supply chamber 11. The first suction pipe 18 which is located near the nozzle 17 maintains an axial distance to the nozzle 17, while the rear suction pipe 19 maintains an axial distance to the front suction pipe 18. The suction inputs 181 and 191 of the suction pipes 18 and 19 are located coaxially to the pipe axes.

During the fuel supply, the fuel pump 14 aspirates the fuel jet exiting the nozzle 17, identified as a nozzle jet, from the first supply chamber 18 and supplies it into the second supply chamber 12 as identified by flow arrows in FIG. 1. The fuel withdrawn by the fuel pump 14 from the withdrawal chamber 13 is filled from the second supply chamber 12, since a level equalization is performed through the rear supply pipe 19. In the case of lowering fuel level in the first supply chamber 11 which is identified with reference numeral 24, both supply chambers 12 remain substantially filled since fuel which flows out through the front suction pipe 18 in the withdrawal chamber 13 is always replenished from the first supply chamber 11. The fuel level in the second supply chamber 12 is identified with reference numeral 25 and the fuel level in the withdrawal chamber 13 is identified with reference numeral 26. When the first supply chamber 11 is completely emptied, the front suction pipe 18 is completely bridged by the nozzle jet 17, and the nozzle jet activates the second suction pipe 19, through which fuel is fed from the second supply chamber 12 into the withdrawal chamber 13. With the sinking fuel level 25 in the second supply chamber 12, the fuel level 26 in the withdrawal chamber 13 remains almost unchanged until the second supply chamber 12 is emptied.

Figure 2:
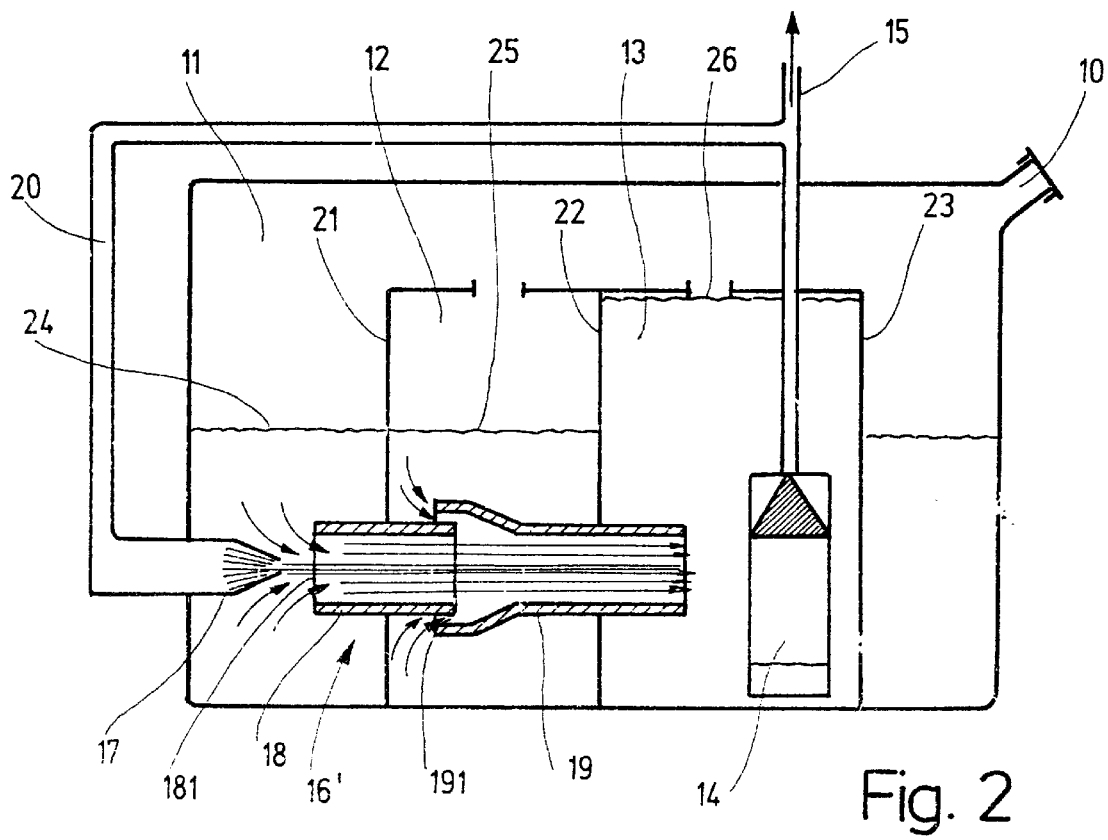
FIG. 2 is a view substantially corresponding to the view of FIG. 1 but showing a modified pump circulating device.

In the fuel container which is schematically shown in section in FIG. 2, the pump circulating device 16' is modified with respect to the arrangement of both suction pipes 18, 19. The identical components are identified with the same reference numerals. In the modified pump circulating device 16', the both suction pipes 18, 19 have again concentrically arranged suction inlets 181, 191, and the suction inlet 181 of the front suction pipe 18 maintains an axial distance from the nozzle 17 as in the pump circulating device 16 of FIG. 1. The rear suction pipe 18 overlaps the end of the front suction pipe 18 which faces the rear suction pipe so as to leave an opening formed as a ring gap. Therefore the suction input 191 of the rear suction pipe 19 is formed from the ring surface remaining between the front and the rear suction pipes 18, 19. For overlapping the front suction pipe 18, the rear suction pipe 19 is expanded in a funnel-shaped manner. Alternatively, the rear suction pipe 19 can be provided with a correspondingly greater diameter than the front suction pipe 18, so that it can be fitted over the front suction pipe 18 without difficulties.

When the fuel pump 14 feeds fuel from the withdrawal chambers 13, the nozzle jet produced in the nozzle 17 sucks fuel from the first supply chamber 11 and also from the second supply chamber 12 and feeds the same directly into the withdrawal chamber 13. The fuel levels 24 and 25 in both supply chambers 11, 12 lower approximately in the same way, while the first supply chamber 11 has a small lead during emptying. When the first supply chamber 11 is completely emptied, the nozzle jet bridges the front suction pipe 18, and the withdrawal chamber 13 is filled from the second supply chamber 12 until it empties.

Figure 3:
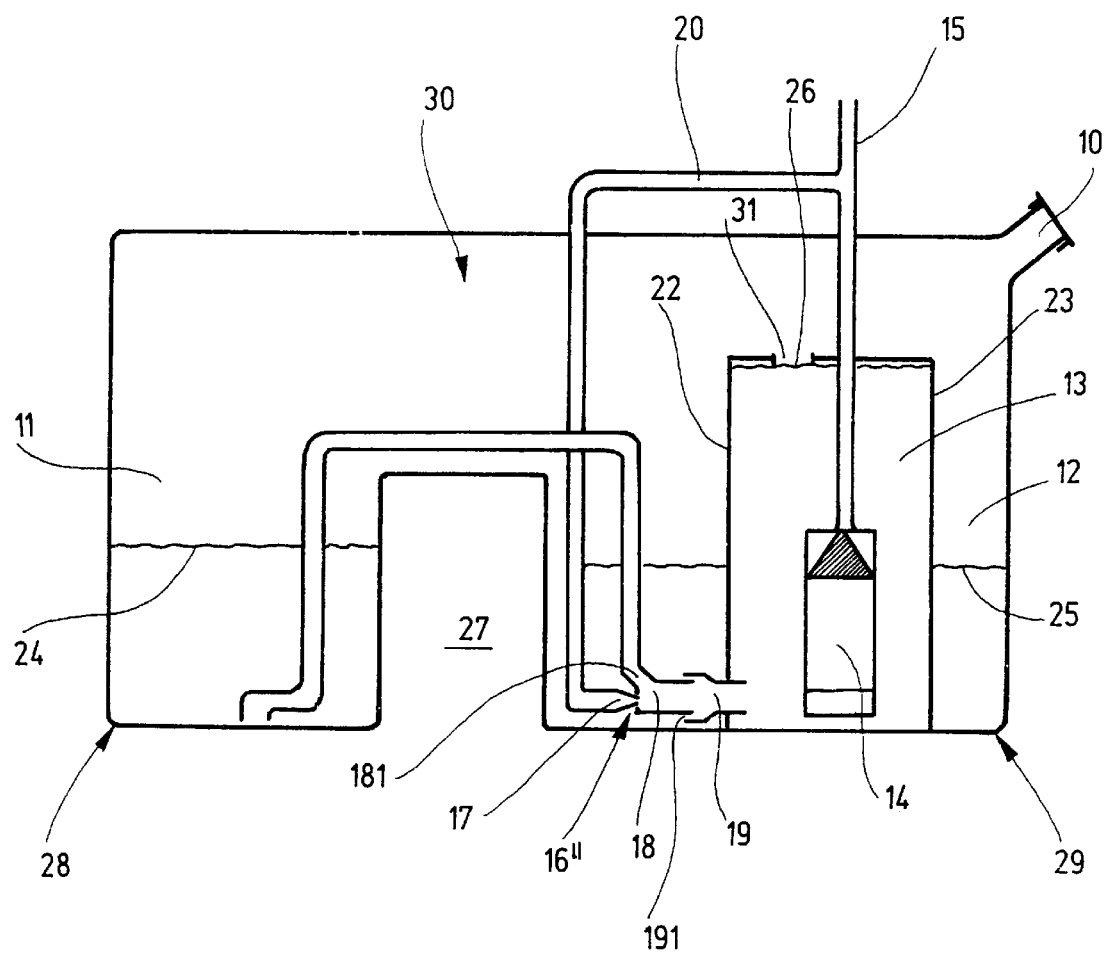
FIG. 3 is a longitudinal section of a fuel container in accordance with present invention which is formed as a so-called saddle tank.

FIG. 3 schematically shows a fuel container in a sketchy manner which is formed as a so-called saddle tank. It is designed so that, for example, it can be installed under a back seat of a passenger vehicle. For this purpose, the central region forms a tunnel 27 for passage of a hinge shaft for a rear axle drive. The tunnel 27 separates the fuel container into two saddle pockets 28, 29 which form two supply chambers 11, 12. The both saddle pockets 28, 29 are connected with one another by a bridging chamber 30. The withdrawing chamber 13 is arranged in the saddle axle 28 and separated from the second supply chamber 12 by the partitions 22 and 23. The partitions 22, 23 extend from the bottom of the saddle pocket 28 to the bridging chamber 30 and guide laterally to the side wall of the saddle pocket 29.

The above closed withdrawal chamber 13 has a connection to the bridging chamber 30 through an opening 31 so that in the case of almost completely filled fuel container it is filled with fuel through the opening 31. The pump circulating device 16" which operates in accordance with the jet principle is arranged in the second supply chamber 12. Its nozzle 17 is also connected to the fuel conduit 20 which branches from the feed conduit 15. The rear suction pipe 19 which faces away from the nozzle 17 passes through the partition 22 to the withdrawal chamber 13 and overlaps the same so as to leave an opening formed as a ring gap. The ring gap forms a concentric suction input 191 of the rear suction pipe 19 with the rear end of the coaxially arranged, front suction pipe 18. The front suction pipe 18 is connected with a nozzle 17 without a gap. Its suction inlet 181 formed in the pipe outer surface is inclined relative to its axis under an acute angle to the suction pipe axis and is connected with the suction conduit 31. The suction conduit is guided over the tunnel 27 through the bridging chamber 30 to the saddle pocket 26 and opens into the vicinity of the bottom.

During feeding of fuel through the fuel pump 14, the nozzle jet which passes through both suction pipes 18, 19 aspirates fuel through the suction pipe 18 connected with the suction conduit 32, from the first supply chamber 11 and through the suction pipe 19 aspirates fuel from the second supply chamber 12. It supplies the fuel into the withdrawal chamber 13 so that its fuel level 26 maintains at its upper level in the event of substantially uniformly sinking fuel levels 24 and 25 in both supply chambers 11, 12. As with the pump circulating device 16' in FIG. 2, both supply chambers 11, 12 in first proximation are emptied simultaneously with some lead of the first supply chamber 11.

With the pump circulating device 16", the rear suction pipe 19 can be formed also as the corresponding suction pipe 19 in the pump circulating device 16 of FIG. 1, or in other words with an axial distance from the front suction pipe 18. With this deviation of the pump circulating device 16", as shown in FIG. 1, fuel is pumped from the first supply chamber 11 into the second supply chamber 12 and from the second supply chamber 12 into the withdrawal chamber 13.

It will be understood that each of the elements described above, or two or more together, may also find a useful application in other types of constructions differing from the types described above.

While the invention has been illustrated and described as embodied in fuel container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fuel container for a motor vehicle, comprising at least two supply chambers and a withdrawal chamber; a fuel pump feeding fuel from said withdrawal chamber; a pump circulating device operating in accordance with the principle of a suction jet and circulating fuel from at least one of said supply chambers into said withdrawal chamber, said pump circulating device including a single nozzle through which at least a part of a fuel stream fed by said fuel pump passes, and at least two suction pipes arranged one after the other in alignment with one another in a fuel jet produced by said nozzle and having suction inlets which communicate with a respective one of said supply chambers, a last one of said suction pipes having an outlet which faces away from said nozzle and is connected with said withdrawal chamber.

2. A fuel container as defined in claim 1; and further comprising partitions which separate said chambers from one another, at least one of said suction pipes extending through one of said partitions.

3. A fuel container as defined in claim 1, wherein said suction pipes have pipe axes, said suction inlets of said suction pipes being concentrical to said pipe axes, said pipe axes coincide with an axes of said nozzle.

4. A fuel container as defined in claim 1, wherein said suction pipes include a front suction pipe located closer to said nozzle and arranged at an axial distance from an outlet of said nozzle.

5. A fuel container as defined in claim 4, wherein said suction pipes include a rear suction pipe which is arranged with an axial distance from an end of said front suction pipe.

6. A fuel container as defined in claim 5, wherein said rear suction pipe overlaps an end of said front suction pipe so as to leave an opening forming said suction inlet of said rear suction pipe.

7. A fuel container as defined in claim 1, wherein said supply chambers are formed by saddle pockets which are connected with one another by a bridging chamber so as to form a saddle structure, said withdrawal chamber being arranged in one of said saddle pockets, said pump circulating device being arranged in said one saddle pocket which contains said withdrawal chamber, said suction pipes including a front suction pipe which faces said nozzle and is connected with said nozzle without a gap; and further comprising a suction conduit arranged so that said suction inlet of said front suction pipe is connected with said suction conduit near a bottom of the other of said saddle pockets.

8. A fuel container as defined in claim 1, wherein said suction pipes include a rear suction pipe said suction inlet of said rear suction pipe being formed concentrically to an axis of said rear suction pipe.

9. A fuel container as defined in claim 1, wherein said suction pipes include a front suction pipe and a rear suction pipe, said rear suction pipe being arranged at an axial distance from said front suction pipe.

10. A fuel container as defined in claim 1, wherein said suction pipes include a rear suction pipe and a front suction pipe, said front suction pipe overlapping said suction inlet of said rear suction pipe so as to leave an opening.

11. A fuel container as defined in claim 1; and further comprising a partition separating said withdrawal chamber from said supply chamber, said suction pipes including a rear suction pipe which extends through said partition.

* * * * *